US008601737B2

(12) United States Patent
Beer et al.

(10) Patent No.: US 8,601,737 B2
(45) Date of Patent: Dec. 10, 2013

(54) RATTLE-TYPE FISHING TACKLE COMPONENT

(75) Inventors: Steven R. Beer, Brandon, WI (US); Jon W. Ninnemann, Madison, WI (US)

(73) Assignee: Chad Wiskow, Menasha, WI (US)

( * ) Notice: Subject to any disclaimer, the term of this patent is extended or adjusted under 35 U.S.C. 154(b) by 1393 days.

(21) Appl. No.: 11/055,371

(22) Filed: Feb. 10, 2005

(65) Prior Publication Data

US 2006/0174535 A1 Aug. 10, 2006

(51) Int. Cl.
*A01K 85/01* (2006.01)

(52) U.S. Cl.
USPC ........................................................ 43/42.31

(58) Field of Classification Search
USPC .................... 43/42.22, 42.31, 42.35
See application file for complete search history.

(56) References Cited

U.S. PATENT DOCUMENTS

| | | | |
|---|---|---|---|
| 2,703,947 A | | 3/1955 | Petrasek et al. |
| 2,718,725 A | * | 9/1955 | Thurman ..................... 43/42.31 |
| 3,091,049 A | | 5/1963 | Reimers |
| 3,802,115 A | * | 4/1974 | Auten et al. ................. 43/42.31 |
| 3,935,660 A | * | 2/1976 | Plew ............................ 43/42.31 |
| 4,163,338 A | | 8/1979 | Lucarini |
| 4,203,246 A | * | 5/1980 | Sacharnoski, Sr. .......... 43/42.31 |
| 4,619,068 A | | 10/1986 | Wotawa |
| 4,745,700 A | | 5/1988 | Davis |
| 4,747,228 A | * | 5/1988 | Giovengo, Jr. ............... 43/42.31 |
| 4,791,750 A | * | 12/1988 | Gammill ....................... 43/42.31 |
| 4,930,247 A | | 6/1990 | Dubois |
| 5,024,019 A | | 6/1991 | Rust et al. |
| 5,038,513 A | | 8/1991 | Hardin |
| 5,121,568 A | | 6/1992 | Lindmeyer |
| 5,133,146 A | | 7/1992 | Stecher |
| 5,355,612 A | | 10/1994 | Smith |
| 5,381,621 A | | 1/1995 | Fuller |
| 5,499,471 A | * | 3/1996 | Foutch et al. ................. 43/42.31 |
| 5,517,782 A | * | 5/1996 | Link et al. ................... 43/42.31 |
| 5,890,315 A | * | 4/1999 | Norton ......................... 43/42.31 |
| D409,271 S | * | 5/1999 | Norton ......................... D22/126 |
| 5,946,847 A | | 9/1999 | North |
| 6,082,038 A | * | 7/2000 | Link ............................ 43/42.24 |

(Continued)

FOREIGN PATENT DOCUMENTS

JP 9-163898 * 6/1997

OTHER PUBLICATIONS

English translation of Japanese Patent JP 9-163898, to Takashi Kitayama, Jun. 24, 1997.*
Storm Catalog, p. 91.

(Continued)

*Primary Examiner* — David Parsley
(74) *Attorney, Agent, or Firm* — Boardman & Clark LLP

(57) ABSTRACT

A fishing tackle component has a portion useable to receive a noise making mechanism, which can be a depression. The noise making mechanism is a rattle mechanism, including a capsule containing at least two rattle elements. The rattle elements may have a minimum curvature that is greater than a maximum curvature of the capsule, allowing the rattle elements to move freely inside the capsule. Consequently, the capsule does not have acute angles or areas of extreme curvature in which the rattle elements can lodge disabling the noise. The rattle mechanism is mounted to the receiving portion, such as in the depression. As the lure is moved through the water, the rattle mechanism at least sporadically produces a noise regardless of the speed or trajectory of the tackle component in the water.

10 Claims, 4 Drawing Sheets

(56) References Cited

U.S. PATENT DOCUMENTS

| | | | |
|---|---|---|---|
| 6,155,000 A | 12/2000 | Ravencroft | |
| 6,195,930 B1 | 3/2001 | Sato | |
| 6,199,312 B1 * | 3/2001 | Link | 43/42.24 |
| 6,209,254 B1 | 4/2001 | Sylla et al. | |
| 6,318,016 B1 | 11/2001 | Ellig | |
| 6,457,275 B1 | 10/2002 | Spurgeon | |
| 6,510,646 B1 | 1/2003 | Kechriotis | |
| 6,560,915 B2 | 5/2003 | Downey | |
| 6,601,336 B1 | 8/2003 | Link | |
| 6,651,376 B1 * | 11/2003 | Link | 43/42.31 |

OTHER PUBLICATIONS

Lakeland Incorporated, 2005 Catalog, p. 2.
"Lures," Norton Brass Rattler website: www.nortonbrassrattler.com, 3 pages printed Aug. 22, 2008.

* cited by examiner

RATTLE-TYPE FISHING TACKLE COMPONENT

BACKGROUND OF THE INVENTION

1. Field of the Invention

This invention relates to a fishing lure.

2. Related Art

Fishing lures of varying degree of intricacy have been devised to attract different types of fish by appealing to the sense of feel, smell, sight and/or sound of the different types of fish. Lures can be simple, comprising "terminal tackle", such as a simple hook or jig. Lures can also be complex, including "in-line tackle" components, such as blades, spoons, swivels or skirts as well as the necessary hook. An example of a simple lure is found in U.S. Pat. No. 6,318,016, which describes a luminous jig. In contrast, in-line tackle lures or "spinner bait" lures can be considerably more complex, including multiple blades, spoons and/or prey-type effigies connected by various coupling devices such as swivels, rods and arms. Examples of such complex lures are described in U.S. Pat. No. 5,381,621, which describes a jointed spinner bait lure having a spinner blade connected to a swivel and then to one end of an arm, where a lure body that includes a hook is connected to the other end of the arm. U.S. Pat. No. 6,155,000 describes a spinner bait lure having a rattle body on one end of an arm and an ornamented hook on the other end of the arm.

In addition, fishing lures may use multiple methods to attract fish. For example, some fishing lures attempt to attract fish by stimulating the fishes' sense of sound, feel and/or vision. Such visual cues include luminous components and/or components that resemble a desired prey, such as described in U.S. Pat. No. 6,560,915, which discloses a lure resembling a minnow, and U.S. Pat. No. 6,195,930, which describes a lure resembling a frog.

Other lures attempt to attract fish by making noises to stimulate the fishes' sense of sound or vibration. These lures employ various noise-making mechanisms that rely on movement of the lure through the water to generate the noise. Generally, noise-making lures are of two types: a rotary, bell-type lure, such as that described in U.S. Pat. No. 4,163,338, and a rattle-type lure, such as that described in U.S. Pat. No. 4,619,068. The '068 Patent describes a spinner bait lure having a hook connected at one end of an arm and one or more spinner blades attached at the other end of the arm. At least one of the spinner blades is hollow, having an elliptical cavity that contains a plurality of metal pellets or shot that are intended to rattle against each other and/or the side of the cavity as the lure is drawn through the water. U.S. Pat. No. 5,121,568 describes a jig lure having a sound chamber surrounding the shaft of the hook. The chamber contains a plurality of metal pellets or shot that is intended to provide a rattling sound as the jig is drawn through the water. U.S. Pat. No. 6,155,000 describes a complex lure having a hook connected to one end of an arm and a planar, rattle body attached to the other end of the arm. The rattle body is divided into separate compartments of a variety of shapes that may be circular, rhomboidal or various irregular shapes.

SUMMARY OF DISCLOSED EMBODIMENTS

These known fishing lures employ a variety of mechanisms to attract fish by attempting to stimulate their sense of sound/vibration, smell and/or vision. However, while visual cues, such as resemblance to a fish's prey, are readily and continuously displayed, those lures designed to attract fish by sound may not continuously make noise when the lure is underwater. Moreover, their effectiveness is difficult to monitor. In the inventors' experience, many noise-making lures often stop making noise soon after they begin to move through the water. The inventors believe this occurs because these lures are designed such that the noise-making mechanism is easily disabled, interrupted or disrupted. It is believed that the noise is disabled, interrupted or disrupted due to the use of a rattle mechanism that includes cavities having areas in which the shot or rattle elements will become lodged or stuck when the lure is moved through the water. This often occurs as the lures are drawn through the water by the fisherman reeling in the fishing line, such that the rattle elements end up at the rear of the cavities. This disabling, interrupting or disrupting of the rattle noise limits the effectiveness of such lures.

This invention provides a rattle mechanism mounted on a separate tackle component.

This invention separately provides a separate rattle capsule mounted on a separate tackle component.

This invention separately provides a rattle capsule defining a rattle chamber that does not provide spaces or areas in which the rattle elements can become lodged.

This invention separately provides a rattle mechanism mounted on a depression formed in a surface of a tackle component.

This invention separately provides a tackle component having a depression formed in a surface of the tackle component usable to receive and mount a separate rattle mechanism.

This invention separately provides a rattle mechanism mounted on a tackle component relative to a center line of the tackle component body.

This invention separately provides a rattle mechanism mounted along a center line of a tackle component body.

This invention separately provides a fishing tackle component that rattles irregularly as it is moved through the water.

This invention separately provides a fishing tackle component including a rattle mechanism having a rattle capsule that does not allow the rattle elements to become lodged in the rattle capsule during use.

This invention separately provides a fishing tackle component including a rattle mechanism having a rattle capsule lacking in acute angles or areas of large curvature where the rattle elements can become lodged.

In various exemplary embodiments, this invention includes a fishing tackle component that comprises a rattle mechanism that at least sporadically rattles regardless of the trajectory or speed of movement of the lure in the water. In various exemplary embodiments, the fishing tackle component comprises in-line tackle components, such as a blade, a spoon, a flasher or the like. In various other exemplary embodiments, the fishing tackle component comprises terminal tackle, such as a jig, a weedless spoon or the like.

In various exemplary embodiments, the rattle mechanism is a separate capsule containing one or more rattle elements that move within a separate rattle chamber. In various exemplary embodiments, no part of the capsule has a curvature that is greater than any curvature of the rattle elements. The rattle elements are ellipsoids, balls, polyhedra or shot and the rattle chamber is a round, polyhedrical, oblong and/or ellipsoid shaped chamber in various exemplary embodiments. The rattle chamber is less-severely curved than the rattle elements placed within it.

In various exemplary embodiments, the rattle capsule is mounted to the tackle component body by locating the capsule in a depression formed on the surface of the tackle component body. In various exemplary embodiments, the depression is formed relative to a center line of the tackle component body. The center line can be a geometric center line, an axis of rotation, a main center line, an angular momentum center line, an axis of symmetry or the like. In various exemplary embodiments, the rattle chamber can be aligned with or even lie along the center line, can be positioned across the center line or the like.

In various exemplary embodiments, this invention includes a fishing tackle component that also includes a rattle mechanism. The rattle mechanism has a capsule defining a rattle chamber with the rattle chamber containing rattle elements. In various exemplary embodiments, the rattle elements have a greater curvature than the capsule such that, regardless of the speed, trajectory or velocity of the lure in the water, the rattle elements freely move within the rattle chamber, and at least periodically make noise.

These and other features and advantages of various exemplary embodiments of the fishing lure and methods according to this invention are described in, or are apparent from, the following detailed description of various exemplary embodiments of the article and methods according to this invention.

BRIEF DESCRIPTION OF THE DRAWINGS

Various exemplary embodiments of the structures according to this invention will be described in detail, with reference to the following figures, wherein.

DETAILED DESCRIPTION OF EXEMPLARY EMBODIMENTS

Figure 1:
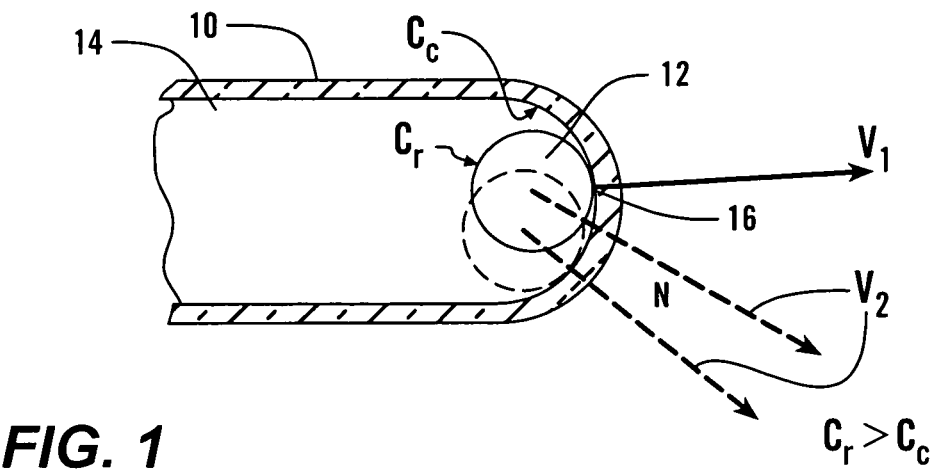
FIG. 1 illustrates a section of a rattle mechanism having a capsule, the capsule having curvature less than a curvature of a rattle element contained within the capsule.

There are almost as many favorite fishing lures as there are anglers. Generally, the term "lure" indicates at least a hook together with any other desired pieces of fishing tackle. The simplest lure may be a single ornamented hook such as a jig and is referred to as "terminal tackle." In contrast, other pieces of fishing tackle are used to build more complex lures. These various pieces of fishing tackle used in conjunction with a hook to build a lure are called "in-line" tackle. Examples of in-line tackle components usable to build complex lures include a variety of blades, spoons, arms, swivels and various other component parts. In various exemplary embodiments of tackle components according to this invention, the rattle mechanism may be connected to a tackle component which may comprise a terminal tackle piece or various in-line tackle pieces. Thus, the rattle mechanism described herein can come as a component piece to be assembled into a lure by a fisherman or can be part of a lure that is readily used by the fisherman.

While there is no shortage of different types of fishing lures, many conventional lures that include noise-making mechanisms to attract fish generally include rattling mechanisms that are easily disrupted, interrupted or disabled. In these noise-making mechanisms, the rattle elements generally become trapped in a portion or area of a rattle element-containing capsule from which the rattle elements cannot freely or easily move, especially when subject to the forces normally applied to the lure as it is moved through the water by the fisherman. Such areas generally result from the geometry of a capsule having a maximum curvature greater than that of the rattle elements. That is, the rattle capsule has areas of the rattle chamber from which the rattle elements cannot easily escape. This allows the rattle elements to become lodged in such areas during use.

For example, in conventional noise-making lures, when the lure moves through the water, the rattle elements become lodged in areas of the rattle chamber that is too small and/or tight to allow free movement of the rattle elements in the rattle chamber. Such tight areas of the rattle chamber can result either from the presence of acute angles in the capsule and/or from the capsule having, for example, a maximum curvature greater than that of the rattle elements. That is, the capsule defines spaces inside the rattle chamber that the rattle elements cannot move away from once the rattle elements enter such spaces.

Generally, curvature can be defined as the amount by which a geometric object deviates from being flat. Thus, in the case of a sphere, for example, the larger the curvature of the sphere is, the smaller the diameter of the sphere will be. In the case of rattle mechanisms, the use of capsules having areas of greater curvature than the curvature of the enclosed rattle elements results in areas of the chamber from which the rattle elements cannot move once they enter those areas. Without the rattle elements moving within the rattle chamber, the noise-making lure experiences an interruption, disruption or disabling of the rattle noise, which decreases the utility of the lure.

FIG. 1 is a schematic diagram illustrating a section of a generic rattle capsule 10 with a rattle element 12 shown inside a rattle chamber 14. As shown, the rattle element 12 has a greater curvature $C_r$ than the curvature $C_c$ of the capsule 10. As shown in FIG. 1, when the rattle capsule 10 is drawn through the water to the left of the figure, the rattle element 12 experiences a relative motion vector $V_1$ that extends through the rattle chamber 14 to the right. As shown in FIG. 1, when a line N, extending from the center point of the rattle element 12 to the tangent point 16 of the rattle element 12 against the rattle capsule 10, is aligned with the relative motion vector $V_1$, the rattle element 12 will be stationary relative to the rattle capsule 10. In contrast, FIG. 1 also shows that, when the relative motion vector $V_1$ is replaced by the relative motion vector $V_2$, the relative motion vector $V_2$ will cause the rattle element 12 to move to the position in the rattle chamber 14 shown by the dotted lines, where the line N again becomes aligned with the relative motion vector $V_2$. When the rattle element 12 hits the side of the rattle capsule 10 and/or other rattle elements 12 as it moves from the first position to the second position, the resulting noise can be used to attract fish.

For a multi-rattle-element system, it is believed that the center of the mass of the system will shift along with a shifting relative motion vector so that a line from the center of the mass of the system to the nearest point on the rattle capsule 10 becomes aligned with the relative motion vector. Again, as the rattle elements 12 of such a multi-rattle element system move from the first position to the second position, they will hit each other and/or the capsule wall, again making the desired noise.

Figure 2:
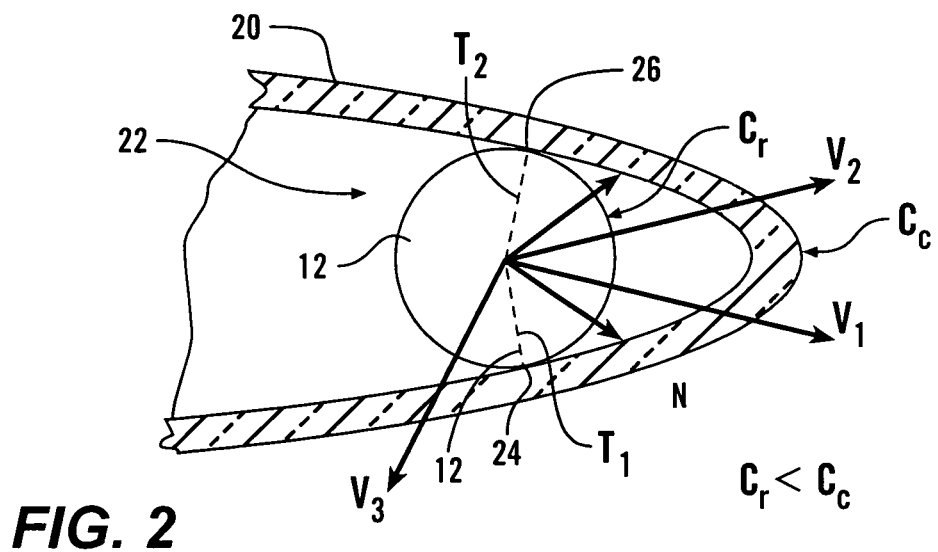
FIGS. 2 and 3 illustrate sections of rattle mechanisms having a capsule having a curvature greater than the curvature of a rattle element contained within the capsule.

FIG. 2 is a schematic diagram of a rattle element 12 inside a rattle chamber 22 where the rattle capsule 20 has a greater curvature $C_c$ than the curvature $C_r$ of the rattle element 12. Because the rattle chamber 20 has the greater curvature, the rattle element 12 contacts the rattle chamber 20 at two points, 24 and 26, rather than at the single point of contact shown in FIG. 1. As a result, when the relative motion changes from along the relative motion vector $V_1$ to along the relative motion vector $V_2$, the rattle element 12 does not move. That is, both vectors $V_1$ and $V_2$ lie between the normal lines $T_1$ and $T_2$, causing the rattle element 12 to remain in the same position. In effect, as long as the relative motion vector is between the two normal lines $T_1$ and $T_2$, the rattle element 12 is "jammed" or "trapped" in the position shown in FIG. 2.

Because the rattle element 12 will not be able to move until the relative motion vector is outside of either of the two normal lines $T_1$ and $T_2$, such as for the relative motion vector $V_3$, the rattle element 12 will not make any noise. For a multi-rattle-element system, the same effect occurs when the relative motion vector extending from the center of the mass of the system lies between the normal lines that extend perpendicularly from points of contact of the rattle elements 12 with the wall of the rattle capsule 20.

Figure 3:
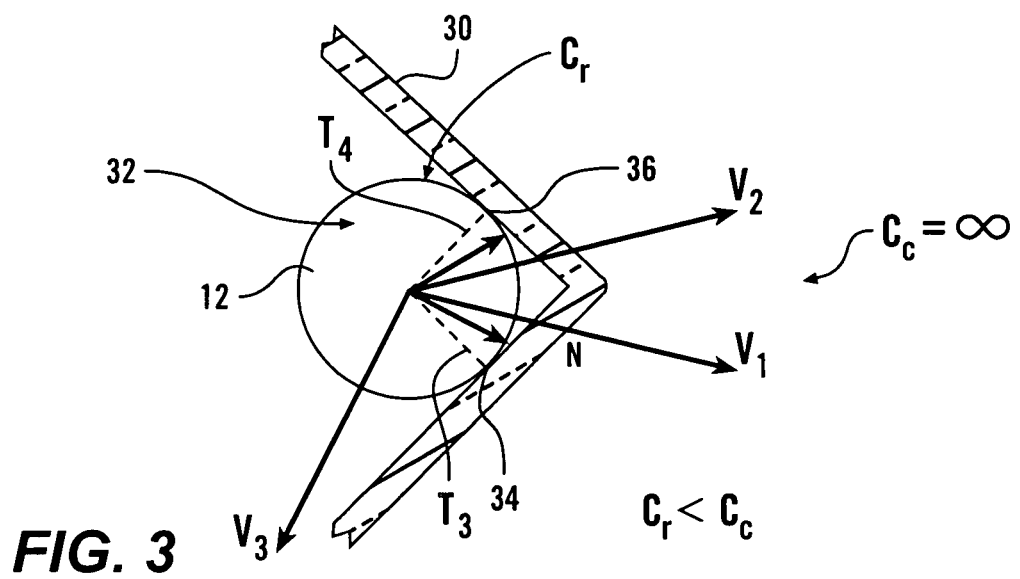

FIG. 3 is a schematic representation of a capsule 30 that has a corner. This corner is a discontinuity such that the curvature can be considered to be infinite. In this example, the result is similar to that illustrated in FIG. 2. In this case, the rattle element 12 will not be able to move until the relative motion vector is outside of the two normal lines $T_3$ and $T_4$. That is regardless of the change in the relative motion as the relative motion vector $V_1$ changes to the relative motion vector $V_2$, the rattle element 12 cannot change position. Therefore, the rattle element 12 is lodged in this area of the rattle capsule 30 until the relative motion vector V changes sufficiently so that the relative motion vector V does not lie between the tangent points 34 and 36, such as shown for the relative motion vector $V_3$. In the meantime, the noise making is disabled.

Figure 4:
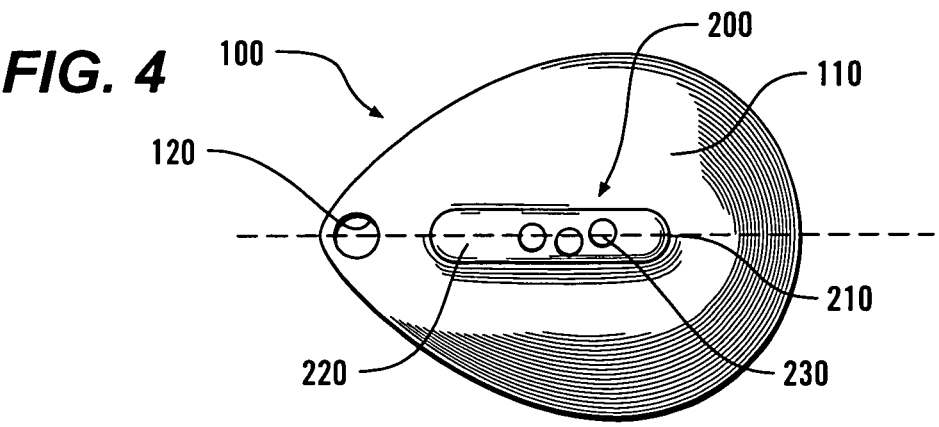
FIG. 4 is a top plan view of one exemplary embodiment of a tackle component body and rattle mechanism according to this invention.

FIG. 4 is a top-plan view of one exemplary embodiment of a fishing tackle component according to this invention. As shown, in this embodiment of the invention 100, the tackle component comprises a blade 110. Such blades 110 are typically referred to as "Colorado" or "Indiana" spinner blades and are commercially available from, for example, Lakeland Inc., (Isle, Minn.). While FIGS. 4-7 show spinner blades as the in-line tackle component, it should be appreciated that any type in-line tackle component that permits a depression to be formed on an outer surface of that tackle component that is usable to securely mount a rattle mechanism according to this invention can be used. It should also be appreciated that the spinner-type in-line tackle components are not limited to the types of spinner blades shown and/or discussed herein.

The blade 110 has an eyelet 120 at the front end that is attachable to other pieces of fishing tackle, such as swivels, rings, line or hooks. FIG. 4 also shows a rattle mechanism 200 that, in this exemplary embodiment, is mounted on the blade 110 at a receiving area that, in this exemplary embodiment, is at approximately along a geometrical center line of the blade 110, represented by the dashed line. Rattle mechanisms such as that shown are commercially available from, for example, P&P Rattle Co. (Champaign, Ill.). In the exemplary embodiment shown in FIG. 4, the rattle mechanism comprises an oblong rattle capsule 210 that defines a rattle chamber 220 and contains small spherical rattle elements 230. In various exemplary embodiments, the rattle elements 230 may be steel shot, brass shot, ceramic pellets or any other hard material that creates sufficient sound waves when contacting the walls of the rattle capsule 210 and/or other rattle elements 230.

It should be appreciated that tackle components such as those described are available in different sizes. For example, when smaller size fish, such as walleye are the game, the spinner blade used may be a size 2 through 5. However, when larger fish, such as muskie, are the desired game, the blade size may be larger such as a size 6 through 9. In addition, when the size of the blade is small, a smaller rattle may be used such as, for example, Saltwater Rattles™ or Worm Rattles™ (P&P Rattle Co., Cat. Nos. 20110W and 00110W respectively). When larger blades are used, larger rattles may be used, such as, for example, Saltwater Magnum Rattles™ or Super Magnum Tube Rattles (P&P Rattle Co., Cat. Nos. 22123W and 12003W respectively).

Figure 5:
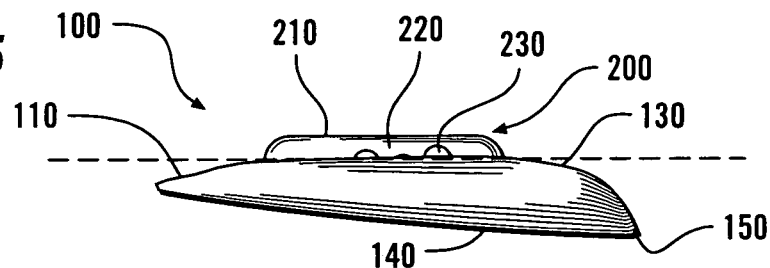
FIG. 5 is a side plan view of the tackle component body and rattle mechanism of FIG. 1.

FIG. 5 is a side plan view of the fishing tackle component 100 shown in FIG. 4 with the dashed line representing the midline of the rattle chamber 220. As shown in FIG. 5, the fishing tackle component 100 has a roughly convex top surface 130 and a roughly concave bottom surface 140. The rear end of the blade has a lip 150 that extends downward. Due to the shape of the blade 110, when it is cast into the water and reeled in, the blade 110 spins in concentric motions around the fishing line.

Figure 6:
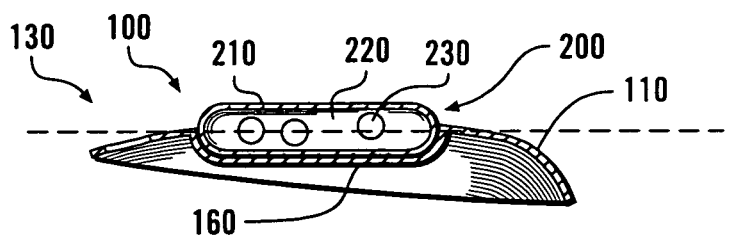
FIG. 6 is a side plan, cut-away view of the tackle component and rattle mechanism of FIG. 1.
Figure 10:
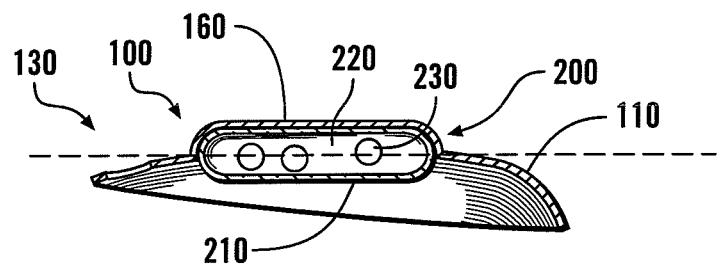
FIG. 10 is a side plan, cut-away view of an alternative exemplary embodiment of the tackle component and rattle mechanism of FIG. 6.

FIG. 6 is a side cross-sectional view of the fishing tackle component 100 shown in FIG. 4. In the exemplary embodiment shown in FIG. 6, the spinner blade 110 includes a depression 160 formed on a surface of the blade 110. In the exemplary embodiment shown in FIG. 6, the depression is formed on the outward-facing or convex surface of the blade 110. Of course, it should be appreciated that the depression could be formed on any surface of the blade 110, such as the concave or downward-facing surface as shown in FIG. 10.

As shown in FIG. 6, in this exemplary embodiment, the capsule 210 is mounted onto the blade 110 in the depression 160 formed in the top surface of the blade 110, by gluing or otherwise adhering, welding, or otherwise attaching the capsule 210 into the depression 160. It should be appreciated that, in various exemplary embodiments, the depth of the depression 160 is approximately equal to the radius of the tubular capsule 210. In this view, the dashed line represents the midline of the rattle mechanism 200 situated in the depression 160. Thus, in such exemplary embodiments, a center point of the rattle mechanism 200 is approximately even with the surface of the tackle component 110.

In various exemplary embodiments, the depression 160 is formed by stamping the desired tackle component using a press or the like. However, it should be appreciated that the depression 160 can be formed by any suitable means such as, for example, molding the depression 160 in the tackle component 110 when made or by use of a die or other suitable hand-crafting or machining process. In these various exemplary embodiments, the depth of the depression 160 is approximately half the height of the rattle mechanism. For a rattle capsule having a circular cross-section, the depression in such exemplary embodiments would have a depth equal to the radius of the rattle capsule. This allows a symmetrical distribution of the area and/or mass of the rattle mechanism 210 above and below the surface of the tackle component 110.

It should be appreciated, however, that in various other exemplary embodiments, a hole or slot may be cut in the tackle component body 110 appropriate in size to accommodate the rattle mechanism 200. In these exemplary embodiments, the hole or slot may be slightly smaller than the diameter of the rattle mechanism 200 allowing the rattle mechanism 200 to sit in the slot or hole and be secured in the slot or hole by glue, cement, epoxy or the like. In addition, in various other exemplary embodiments, the rattle mechanism 200 may simply be secured to the top or bottom surface of the tackle component without prior preparing any receiving area. In these exemplary embodiments, glue, cement or the like can be applied to the desired location on the tackle components 110 or to the rattle mechanism and the rattle mechanism secured at the appropriate location onto the tackle component body 110.

Figure 7:
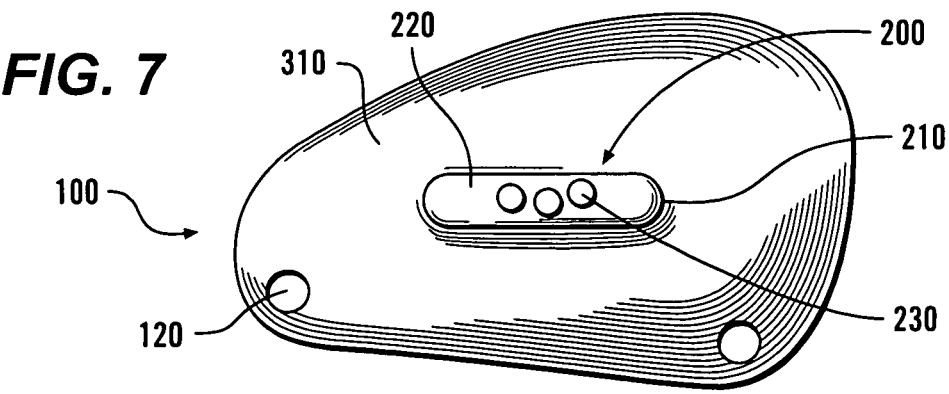
FIG. 7 is a top plan view of a second exemplary embodiment of a tackle component body and rattle mechanism according to this invention.

FIG. 7 is a top plan view of a second exemplary embodiment of the fishing tackle component 100 according to this invention. In this embodiment the tackle component 310 is asymmetrical. In the example shown in FIG. 7, the asymmetrical tackle component 310 is commercially known as a trolling rudder. It should be appreciated that any other asymmetrical lure blades may be used in various other exemplary embodiments of the invention. Such asymmetrical tackle components 310 are commercially available from, for example, Lakeland, Inc., (Isle, Minn.). In the exemplary embodiment shown in FIG. 7, the fishing tackle component 310 includes two eyelets 120 by which the fishing tackle component can be attached to various other tackle components, if desired. FIG. 7 also shows the rattle mechanism 200 secured in a depression, as previously described. It should be appreciated that, while a spinner blade having two eyelets is illustrated in FIG. 7, the spinner blade or other in-line tackle component needs only one such eyelet or attaching structure. Similarly, it should be appreciated that, in some instances, it may be desirable to have three or more eyelets or other attaching structures. Such additional other attaching structures can be used to attach multiple other pieces of fishing tackle components.

In various exemplary embodiments, the depression is parallel to but offset from a center line of the tackle component 110. In various other exemplary embodiments, the depression is aligned with the center line, such that the center line passes through the depression. In various other exemplary embodiments, the center line passes through the depression, but the depression is not aligned with the center line.

It should be appreciated that, in various exemplary embodiments according to this invention, the depression 160 is formed along a center line of the tackle component 110. By forming the depression 160, and mounting the rattle mechanism 210, along a center line of the tackle component 110, the mass and/or area or the rattle mechanism 210 can be distributed evenly on the tackle component 110. It should also be appreciated that, when the rattle mechanism 210 is mounted along a center line of the body of the tackle component 110, the direction of movement of the rattle elements 230 within the rattle mechanism 210 can be better related to the relative motion vector of the tackle component 110. In various exemplary embodiments, the center line of the body of the tackle component 110 may be a geometric center line, an axis of rotation, a main center line, an angular momentum center line, an axis of symmetry or the like.

In various exemplary embodiments, the rattle mechanism 210 can be aligned with or even lie along the center line, can be positioned across the center line of the tackle component or the like. Without being held to any particular theory, the inventors hypothesize that, when the tackle component 110 is a spinner blade, by locating the rattle mechanism 210 along a center line, the angular momentum resulting from the concentric motions of the spinner blade around the fishing line will be transferred to the rattle elements 230 that move freely in the rattle chamber 220. The result is that collisions of the rattle elements 230 with each other or with the capsule will result in the release of energy in the form of sound, experienced either as an audible rattling noise or as felt vibrations.

Additionally, in various exemplary embodiments where any curvature of the rattle chamber is never greater than any curvature of the rattle elements, the rattle elements never become lodged or stuck in a single position on the rattle chamber. Thus, in such exemplary embodiments, the rattle elements at least sporadically, and ideally continuously, move in the rattle chamber as the tackle component moves through the water such that the rattle elements at least irregularly or intermittently make noise.

In various exemplary embodiments, the fish that the angler desires to catch determines the tackle component 110 to be used. For example, the size of the rattle mechanism 210 mounted on the tackle component 110 may be determined by the size of the tackle component and the position on the tackle component 110 on which the rattle mechanism 210 is mounted. In addition, in various exemplary embodiments, it may be desirable to mount the rattle mechanism 210 asymmetrically on the tackle component 110. By mounting the rattle mechanism 210 off of a center line, the tackle component 110 may move erratically in the water as the lure is moved. In some instances, such erratic movement of the tackle component 110 may simulate a desired prey that is wounded or disabled.

Figure 8:
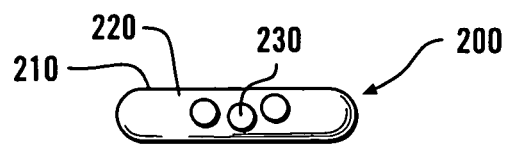
FIG. 8 is a top plan view of the rattle mechanism of the tackle component of FIG. 1.

FIG. 8 is a top-plan view of one exemplary embodiment of a rattle mechanism 200 usable in the exemplary embodiments of the tackle component 100 shown in FIGS. 1 and 7. In the exemplary embodiment shown in FIG. 8, the rattle mechanism includes an oblong capsule 210 defining a rattle chamber 220. The rattle chamber 220 contains a plurality rattle elements 230. In this exemplary embodiment, the capsule 210 is transparent and can be made from glass, plastic or the like while the rattle elements 230 are spherical metal pellets. However, in various other exemplary embodiments, the capsule 210 can be metal, glass, plastic, ceramic or any other suitably hard material and can be any shape that allows free movement of the rattle elements 230 within the rattle chamber 220, such as, for example, spherical. In addition, the rattle elements 230 can be any hard, freely moving material, such as, for example, metal, glass, plastic or ceramic. As shown in this exemplary embodiment, the rattle elements 230 have a smaller diameter and thus have a greater curvature than does the capsule 210. Because the capsule 210 has a maximum curvature less than the minimum curvature of the rattle elements 230, there are no areas of the capsule 210 in which the rattle elements 230 can become lodged. Therefore, the rattle elements 230 remain freely moving and the rattle noise is not interrupted, disrupted or disabled regardless of the trajectory or vector of movement of the tackle component and/or the rattle mechanism in the water.

It should be appreciated that, in various exemplary embodiments according to this invention, the tackle components used can come in a variety of shapes, styles and sizes. For example, in various exemplary embodiments, the tackle component can be in-line components, such as a blade or a spoon that is later assembled with a hook to provide a finished lure. In other exemplary embodiments, the tackle component can be a terminal tackle component that includes a hook, such as a jig or a weedless spoon. Examples of commercially available in-line tackle components include, but are not limited to, the "Indiana," "Colorado," "willowleaf" and "magnum willow" spinner blades, while casting spoons and flutter spoons, for example, are used in various other exemplary embodiments of the invention. Such commercially available fishing tackle component can be obtained from, for example Lakeland, Inc. (Isle, Minn.). Further, in various exemplary embodiments, the tackle component can be symmetrical or unsymmetrical and ornamented or unornamented. Thus, in various other exemplary embodiments, the tackle component can be dimpled, painted or have decals, stickers or other adornments applied such that the blade may be reflective and/or stylistically resemble a minnow, frog or other prey of the desired fish.

Figure 9:
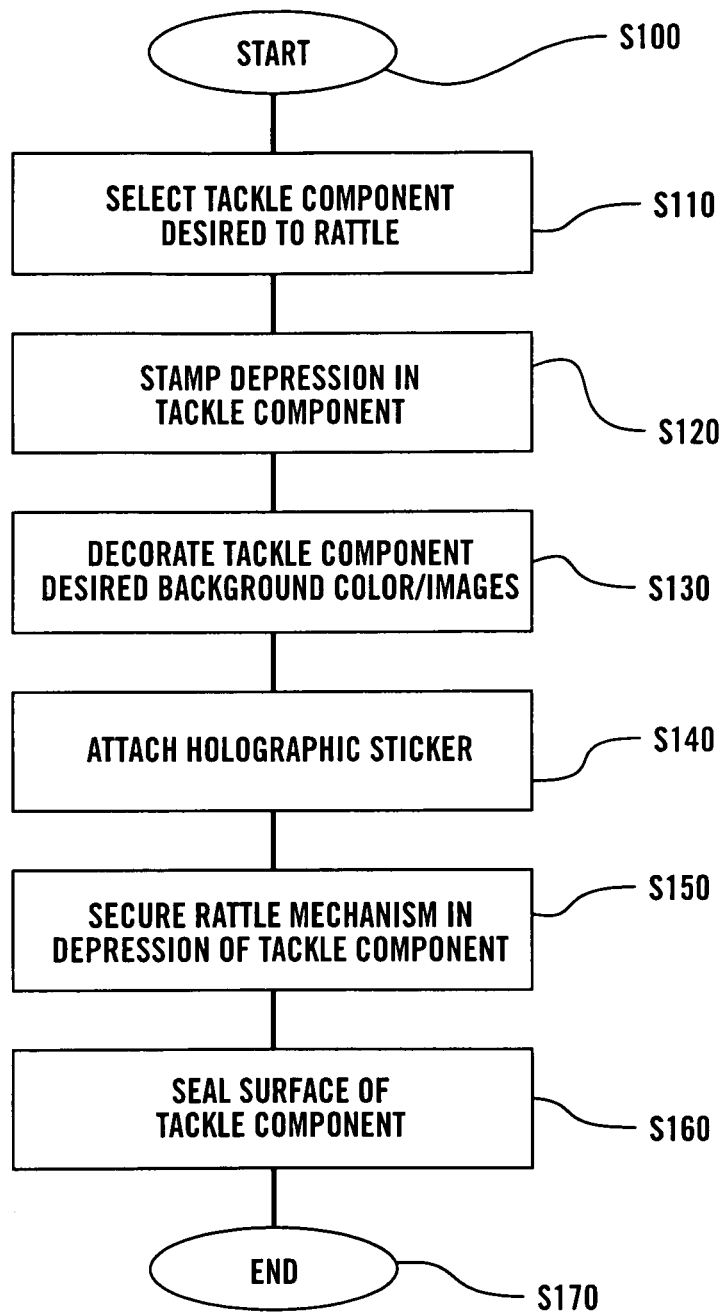
FIG. 9 is a flowchart outlining one exemplary embodiment of a method for preparing a rattle-type fishing tackle component according to this invention.

FIG. 9 is a flow-chart outlining one exemplary embodiment of a method of making a rattling tackle component according to this invention. As shown in FIG. 9, operation of the method starts in step S100, and continues to step S110 where a desired tackle component, such as a spinner blade, is selected. Next, in step S120, a depression, slot or other receiving structure area, suitable to accommodate the rattle mechanism, is formed in the selected tackle component. Then, in step S130, the selected tackle component is decorated, if desired, by painting with one or more background colors, etching, adding visual cues or the like and allowed to dry. Operation then continues to step S140.

In step S140, a holographic sticker may be applied to the selected tackle component. Then, in step S150, the rattle mechanism is secured into the depression, slot or other receiving structure or area formed in the selected tackle component. It should be appreciated that the rattle mechanism can be secured into the depression using glue or other adhesive, providing a coating over the surface of the tackle component at least in areas around the depression, slot or other receiving structure or area, crimping the depression, slot or other receiving area structure or area around the rattle mechanism, or using any other known or later developed technique, device or material that attaches or secures the rattle mechanism in or to the depression, slot or other receiving structure or area. For example, as discussed above, the rattle mechanism can be secured in a receiving structure or area of the tackle component by applying an epoxy compound to the selected tackle component and the rattle mechanism. Operation then continues to step S160, where the surface of the tackle component is covered with a sealing compound to maintain and/or protect the finished tackle component. In various exemplary embodiments, the sealing compound may be any substantially clear coat compound. For example, in various exemplary embodiments, the sealing compound may be glue, a varnish, shellac, a clear paint, polyurethane or the like. Operation then continues to step S170, where operation of the method ends.

It should be appreciated that, in various exemplary embodiments, one or both of steps S130 and S140 can be omitted or replaced with a similar step usable to decorate the tackle component. It should also be appreciated that, in various exemplary embodiments, steps S150 and S160 can be implemented as a single step or as reversed steps, such as when an adhesive is placed into the depression and/or on the rattle mechanism before the rattle mechanism is placed into the depression or when the rattle mechanism is attached to the tackle component without forming a depression, slot or other receiving structure.

In use, a fisherman attaches the noise-making fishing tackle component to a fishing line and casts the fishing line and tackle component into the water. As the fishing line is moved or reeled in, the tackle component moves in the water causing the rattle elements to change position with respect to the rattle chamber. As the rattle elements contact the inner surface of the capsule or each other, a rattling noise and/or vibration is generated that attracts fish stimulated by such noise or vibrations.

Various ones of the above-outlined exemplary embodiments of the fishing tackle component according to this invention are usable to make and use a fishing lure that produces a rattling sound that is not interrupted, disrupted or disabled in use. In particular, each of the various structures and methods described herein are separately useful. Therefore, it should be appreciated that the fishing tackle component according to this invention does not need to use all or even a plurality of the various structures disclosed herein.

While this invention has been described in conjunction with the exemplary embodiment outlined above, various alternatives, modifications, variations, improvements, and/or substantial equivalents, whether known or that are or may be presently unforeseen, may become apparent to those having at least an ordinary skill in the art. Accordingly, the exemplary embodiments of the invention as set forth above are intended to be illustrative, not limiting, various changes may be made without departing from the spirit and scope of the invention. Therefore, the invention is intended to embrace all known or earlier developed alternatives, modifications variations, improvements and/or substantial equivalents.

What is claimed is:

1. A device for catching fish, comprising:
a fishing tackle component having a main body having an outer surface, the outer surface having a first curved portion and a second curved portion, the first curved portion of the outer surface having a first radius of curvature, and the second curved portion of the outer surface provided within the first curved portion of the outer surface, usable to receive a rattle mechanism and having a second radius of curvature that is different than the first radius of curvature; and
a rattle mechanism distinct from the main body and comprising a rattle chamber and first and second ends; wherein:
at least the rattle chamber is mounted to the outer surface of the main body using the second curved portion of the outer surface of the main body of the fishing tackle component;
one or more rattle elements are contained in the rattle chamber;
the second curved portion of the outer surface of the main body of the fishing tackle component comprises a depression or a slot formed in the first curved portion of the outer surface of the main body of the fishing tackle component; and
at least the rattle chamber of the rattle mechanism is mounted in the depression or slot.

2. The device of claim 1, wherein the depression or slot formed in the first curved portion of the outer surface has a long axis that is provided along a center line of the fishing tackle component.

3. The device of claim 1, wherein the depression in the first curved portion of the outer surface has a depth approximately equal to about half of a length of the rattle chamber into the depth of the depression in the first curved portion of the outer surface.

4. The device of claim 1, wherein the first curved portion is a convex portion of the outer surface of the main body and the second curved portion comprises a concave portion of the outer surface of the main body formed in the convex portion of the outer surface of the main body of the fishing tackle component.

5. The device of claim 1, wherein the first curved portion is a first concave portion of the outer surface of the main body and the second curved portion comprises a second concave portion of the outer surface of the main body formed in the first concave portion of the outer surface of the main body of the fishing tackle component.

6. A method of making a noise producing fishing tackle component comprising:

provided a fishing tackle component having a main body having an outer surface, the outer surface having a first curved portion having a first radius of curvature;

providing a rattle mechanism that is distinct from the main body, the rattle mechanism having a rattle chamber containing one or more rattle elements;

providing a second curved portion in the outer surface of the main body by forming a depression or slot in the first curved portion of the outer surface of the main body of the fishing tackle component, the second curved surface located within the first curved portion of the outer surface of the main body of the fishing tackle component, the second curved portion of the outer surface having a second radius of curvature that is different than the first radius of curvature and that is useable to mount at least the rattle chamber to the outer surface of the main body of the fishing tackle component; and mounting at least the rattle chamber of the rattle mechanism to the outer surface of the main body using the second curved portion of the outer surface of the main body of the fishing tackle component.

7. The method of claim 6, wherein mounting at least the rattle chamber comprises positioning at least the rattle chamber in the depression or slot at about a depth equal to a center of the rattle chamber.

8. The method of claim 6, wherein providing a second curved portion of the outer surface of the main body within the first curved portion of the outer surface of the main body of the fishing tackle component comprises providing a second concave portion of the outer surface of the main body within a first concave portion of the outer surface of the main body of the fishing tackle component.

9. The method of claim 6, wherein providing a second curved portion of the outer surface of the main body within the first curved portion of the outer surface of the main body of the fishing tackle component comprises providing a concave portion of the outer surface of the main body within a convex portion of the outer surface of the main body of the fishing tackle component.

10. The method of claim 6, wherein providing a second curved portion of the outer surface of the main body within the first curved portion of the outer surface of the main body of the fishing tackle component comprises deforming a portion of the first curved portion of the main body of the outer surface of the fishing tackle component.

* * * * *